United States Patent
Owen (10) Patent No.: US 7,760,379 B2
(45) Date of Patent: Jul. 20, 2010

(54) SYSTEMS AND METHODS FOR CHANGING SETTINGS FOR SELECTED OBJECTS WITHIN A PRINT JOB

(75) Inventor: James E. Owen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 948 days.

(21) Appl. No.: 11/034,647

(22) Filed: Jan. 13, 2005

(65) Prior Publication Data

US 2006/0152758 A1   Jul. 13, 2006

(51) Int. Cl.
    G06F 3/12   (2006.01)
(52) U.S. Cl. .............. 358/1.15; 358/1.1; 358/1.16; 358/1.18
(58) Field of Classification Search .......... 358/1.1, 358/1.15, 1.16, 1.18
    See application file for complete search history.

(56) References Cited

U.S. PATENT DOCUMENTS

| | | | |
|---|---|---|---|
| 5,579,446 A | 11/1996 | Naik et al. | |
| 5,704,021 A | 12/1997 | Smith et al. | |
| 5,731,823 A | 3/1998 | Miller et al. | |
| 6,040,927 A | 3/2000 | Winter et al. | |
| 6,257,693 B1 | 7/2001 | Miller et al. | |
| 6,275,304 B1 | 8/2001 | Eschbach et al. | |
| 6,377,704 B1 | 4/2002 | Cooperman | |
| 6,616,359 B1 | 9/2003 | Nakagiri et al. | |
| 6,847,466 B1* | 1/2005 | Gazdik et al. | 358/1.15 |
| 7,295,336 B2* | 11/2007 | Yoshida et al. | 358/1.15 |
| 7,675,645 B2* | 3/2010 | Hara | 358/1.18 |
| 2001/0044797 A1 | 11/2001 | Anwar | |
| 2001/0044868 A1 | 11/2001 | Roztocil et al. | |
| 2002/0052897 A1* | 5/2002 | Nishikawa et al. | 707/527 |
| 2002/0131070 A1 | 9/2002 | Housel et al. | |
| 2003/0043414 A1 | 3/2003 | Brady | |
| 2003/0090717 A1* | 5/2003 | Yoshida et al. | 358/1.15 |
| 2004/0090644 A1 | 5/2004 | Nishikawa | |
| 2005/0094846 A1* | 5/2005 | Watanabe | 382/100 |

(Continued)

FOREIGN PATENT DOCUMENTS

EP    1 014 694    6/2000

(Continued)

OTHER PUBLICATIONS

"hp color LaserJet 4600 series printer User Guide", Apr. 2002, 244 pp.

(Continued)

Primary Examiner—Twyler L Haskins
Assistant Examiner—Kent Yip
(74) Attorney, Agent, or Firm—Austin Rapp & Hardman (57) ABSTRACT

An exemplary method involves receiving a document for printing on a printing device. The document includes at least one page. The method also involves obtaining settings for printing the document. At least one preview image is displayed based on the settings. Each preview image that is displayed corresponds to a page of the document. The method also involves detecting selection by a user of at least one object from the at least one preview image. The method also involves receiving from the user at least one new setting for the at least one object selected by the user.

14 Claims, 7 Drawing Sheets

U.S. PATENT DOCUMENTS

2005/0174587 A1* 8/2005 Hara .......................... 358/1.9

FOREIGN PATENT DOCUMENTS

| EP | 1 176 549 | 1/2002 |
|----|-----------|--------|
| GB | 2 282 110 | 3/1995 |
| GB | 2 359 646 | 9/1999 |
| JP | 2004-164106 | 6/2004 |

OTHER PUBLICATIONS

"Sharp Desk 3.0", Dec. 10, 2004, 2 pp., http://www.sharpusa.com/products/docsolutions/sharp_desk/0,2371,,00.html.

"AP3800CMF", Dec. 10, 2004, 6 pp. http://www.ricoh-usa.com/products/brochures/AP3800CMF.pdf.

* cited by examiner

SYSTEMS AND METHODS FOR CHANGING SETTINGS FOR SELECTED OBJECTS WITHIN A PRINT JOB

TECHNICAL FIELD

The present invention relates generally to printing use of a computer. More specifically, the present invention relates to systems and methods for changing settings for selected objects within a print job.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Printers are typically used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

An application program typically has the capability to implement certain printing options. However, many modern printers make available a wide array of options external to an application program's capabilities, such as different layout capabilities, different rendering modes, different paper selections, etc.

There have been many attempts at simplifying the understanding of print job options. Many application programs attempt WYSIWYG (what you see is what you get) displays and print previews which represent the printed version of the document. Printer drivers and other software allow saving, combining, and displaying and altering settings for a plurality of print jobs. Other printer drivers allow iconic representations of different options offered by the printer.

Some known software is capable of performing a "bundle print" function. This "bundle print" function involves holding document data which are instructed to be printed by an application as print jobs in units of document data, without the document data being output to a printer. These jobs are then bundled and sent to the printer as one job. Additionally, some software allows print jobs to be displayed as preview images. Different settings may be provided for different print jobs.

In view of the foregoing, benefits may be realized by systems and methods which allow users to easily use and understand many custom options of today's printers. Benefits may also be realized by systems and methods which allow users to easily set different settings for different objects within the same print job.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

A computer-readable medium for storing program data is disclosed. The program data comprises executable instructions for implementing a method in a computing device. The method involves receiving print commands corresponding to a document from an application. The document comprises at least one page. The method also involves obtaining settings for printing the document on a printing device. At least one preview image is displayed based on the settings. Each preview image that is displayed corresponds to a page of the document. The method also involves detecting selection by a user of at least one object from the at least one preview image. The at least one object may be a physical page, a region of the physical page, a logical page, a region of the logical page, a graphic element, a paper sheet, etc. The method also involves receiving from the user at least one new setting for the at least one object selected by the user.

In some embodiments, the method also involves saving the at least one object selected by the user. The at least one new setting for the at least one object selected by the user may also be saved. The method may additionally involve updating the at least one preview image to reflect the at least one new setting for the at least one object. The document (or portions of the document) may be printed according to the at least one new setting for the at least one object. Dummy commands may be inserted into the spool file. The dummy commands may identify print commands corresponding to the at least one object.

In some embodiments, the method also involves creating a spool file corresponding to the print job. A job setup file may also be created for the spool file. The job setup file may include a public section and a private section. An extra job information section may be included within the private section. At least one object information section may be included within the private section. In some embodiments, each object information section may include an object definition section, a limited public information section, and a limited extra job information section. The object definition section may include an object type section and an object type data section.

A computing device is also disclosed. The computing device includes a processor and memory in electronic communication with the processor. Instructions are stored in the memory. The instructions are executable to implement a method that involves receiving print commands corresponding to a document from an application. The document comprises at least one page. The method also involves obtaining settings for printing the document on a printing device. At least one preview image is displayed based on the settings. Each preview image that is displayed corresponds to a page of the document. The method also involves detecting selection by a user of at least one object from the at least one preview image. The method also involves receiving from the user at least one new setting for the at least one object selected by the user.

A method in a computing device is also disclosed. The method involves receiving print commands corresponding to a document from an application. The document comprises at least one page. The method also involves obtaining settings for printing the document on a printing device. At least one preview image is displayed based on the settings. Each preview image that is displayed corresponds to a page of the document. The method also involves detecting selection by a user of at least one object from the at least one preview image. The method also involves receiving from the user at least one new setting for the at least one object selected by the user.

Various embodiments of the invention are now described with reference to the Figures, where like reference numbers indicate identical or functionally similar elements. It will be readily understood that the embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software components stored in a computing device. As used herein, a software component may include any type of computer instruction or computer executable code located within a memory device and/or transmitted as electronic signals over a system bus or network. A software component may, for instance, comprise one or more physical or logical blocks of computer instructions, which may be organized as a routine, program, object, data structure, etc., that performs one or more tasks or implements particular abstract data types.

In certain embodiments, a particular software component may comprise disparate instructions stored in different locations of a memory device, which together implement the described functionality of the component. Indeed, a software component may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, different portions of the same software component may be located in local and/or remote memory storage devices.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

Figure 1:
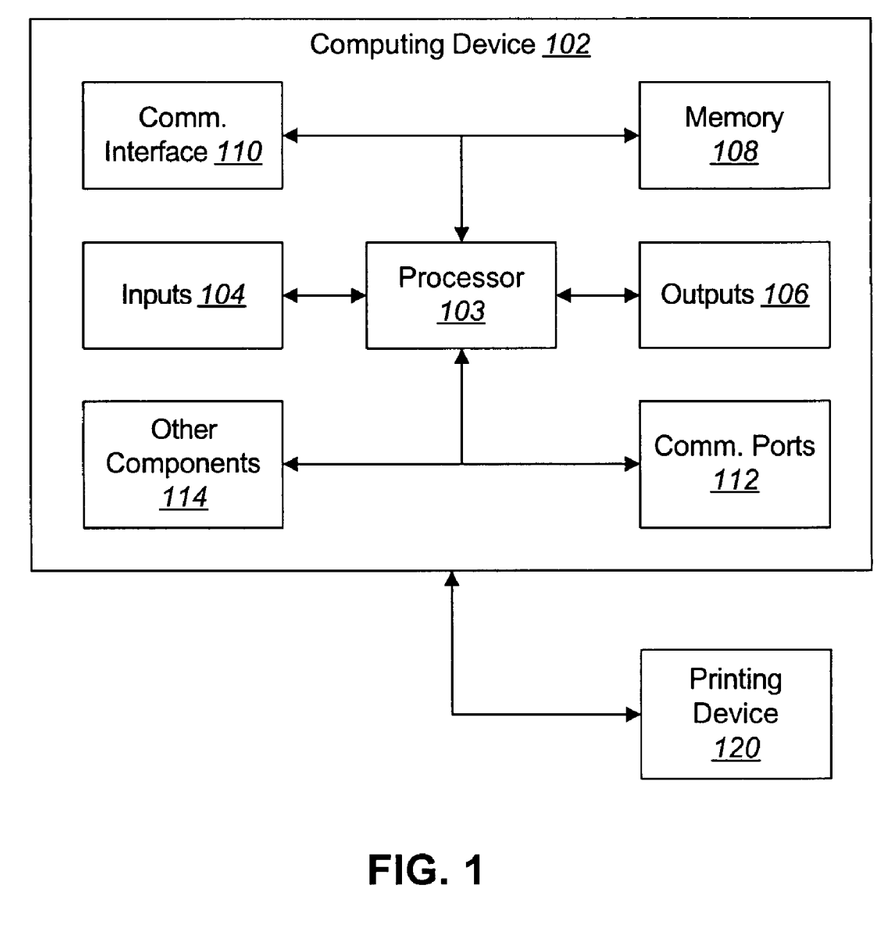
FIG. 1 is a block diagram illustrating the major hardware components typically utilized with embodiments herein.

FIG. 1 is a block diagram illustrating the major hardware components typically utilized with embodiments herein. The systems and methods disclosed herein may involve interaction between a computing device 102 and a printing device 120. Computing devices 102 are known in the art and are commercially available. The major hardware components typically utilized in a computing device 102 are illustrated in FIG. 1. A computing device 102 typically includes a processor 103 in electronic communication with input components or devices 104 and/or output components or devices 106. The processor 103 is operably connected to input 104 and/or output devices 106 capable of electronic communication with the processor 103, or, in other words, to devices capable of input and/or output in the form of an electrical signal. Embodiments of computing devices 102 may include the inputs 104, outputs 106 and the processor 103 within the same physical structure or in separate housings or structures.

The computing device 102 may also include memory 108. As used herein, the term "memory" 108 is broadly defined as any electronic component capable of storing electronic information, and may be embodied as read only memory (ROM), random access memory (RAM), magnetic disk storage media, optical storage media, flash memory devices in RAM, on-board memory included with the processor 103, EPROM memory, EEPROM memory, registers, etc. The memory 108 typically stores program instructions and other types of data. The program instructions may be executed by the processor 103 to implement some or all of the methods disclosed herein.

The processor 103 is also in electronic communication with a communication interface 110. The communication interface 110 may be used for communications with other computing devices 102, printing devices 120, servers, etc. The computing device 102 may also include other communication ports 112. In addition, other components 114 may also be included in the computing device 102.

Many kinds of different devices may be used with embodiments herein. The computing device 102 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 1 is only meant to illustrate typical components of a computing device 102 and is not meant to limit the scope of embodiments disclosed herein.

The computing device 102 is in electronic communication with a printing device 120. Printing devices 120 include, but are not limited to, a printer, fax machine, scanner, multifunctional peripheral, copier, and so forth. A typical printing device 120 is a type of computing device 102. As a result, it also includes a processor 103, memory 108, communications interface 110, etc., as shown and illustrated in relation to FIG. 1. The printing device 120, as shown in FIG. 1, may be a single or a plural grouping (e.g., pool or cluster) of two or more devices.

Figure 2:
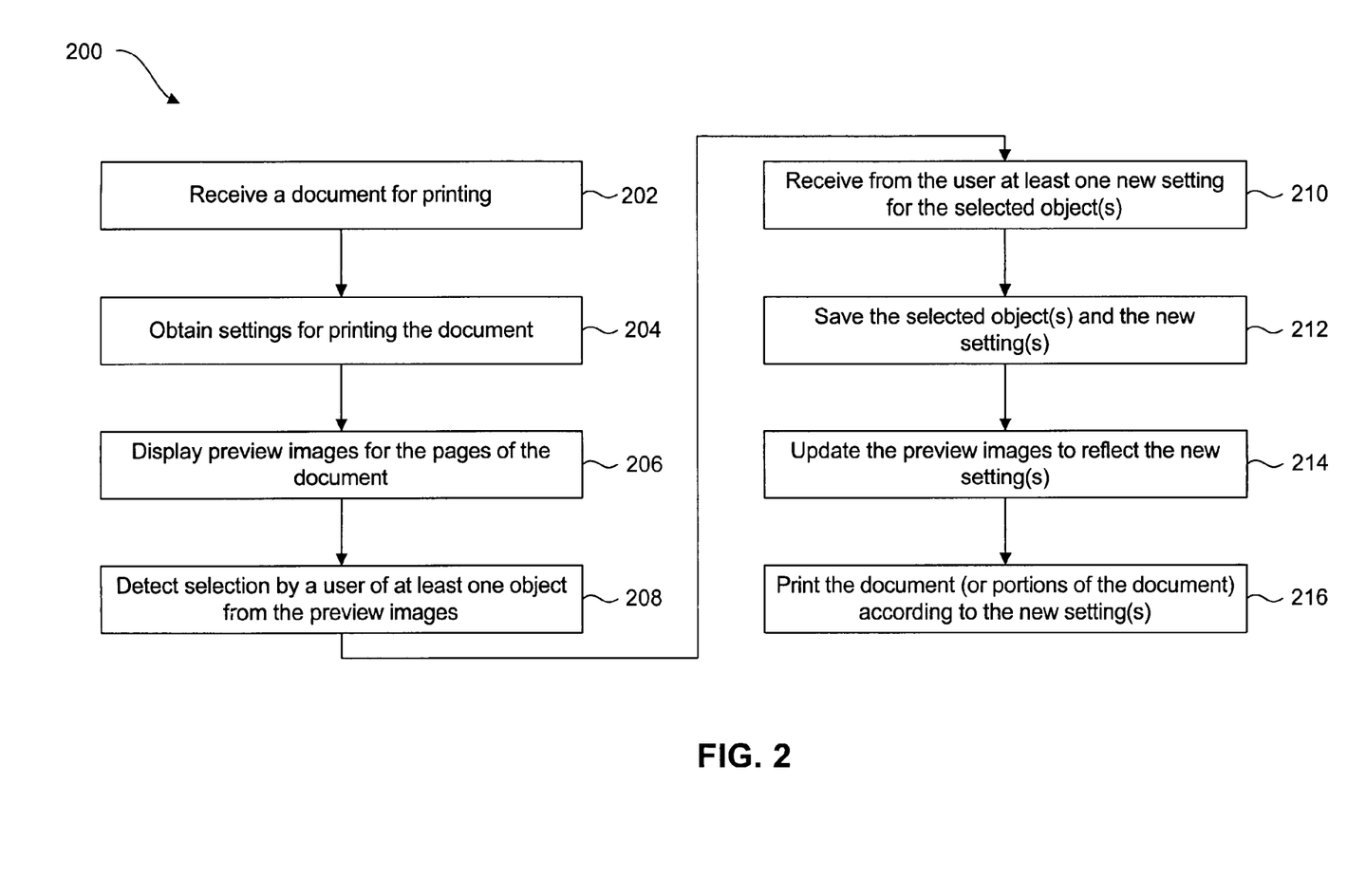
FIG. 2 illustrates an exemplary method which may be performed by software components in the computing device of FIG. 1 and which allows a user to quickly and easily change the print settings for certain selected objects within a print job.

The memory 108 of the computing device 102 includes various software components. These software components, when executed by the processor 103, may implement various methods related to printing and print job management. FIG. 2 illustrates an exemplary method 200 which may be performed by software components in the computing device 102 of FIG. 1 and which allows a user to quickly and easily change the print settings for certain selected objects within a print job.

The method 200 begins when a document is received 202 for printing. Default settings are obtained 204 for printing the document. The method 200 then involves displaying 206 one or more preview images for the pages of the document. A preview image may be displayed for each page of the document. Alternatively, preview images may be displayed for only some of the pages of the document.

The preview images show how the document will appear when printed, based on the default settings obtained in step 204. If the user is not completely satisfied with the way that the document will appear when printed, the method 200 allows the user to change the print settings for some of the objects within the document. More specifically, the method 200 involves detecting 208 selection by a user of at least one object from the preview images that are displayed. As used herein, the term "object" should be construed broadly, and may refer to a physical page, a region of a physical page, a logical page, a region of a logical page, a single graphic element, a paper sheet (both sides of a physical page), a plurality of any of these, and so forth.

The method 200 then involves receiving 210 from the user at least one new print setting for the selected object(s). The selected object(s) and the new print setting(s) are saved 212, and the preview images are updated 214 to reflect the new print setting(s). If the user is still not completely satisfied with the way that the document will appear when printed, steps 208 through 214 may be repeated as many times as desired. Once the user is happy with the way that the document will appear when printed, the user may indicate that the document is ready to be printed. The method 200 then involves printing 216 the document (or portions of the document) according to the new print setting(s).

Figure 3:
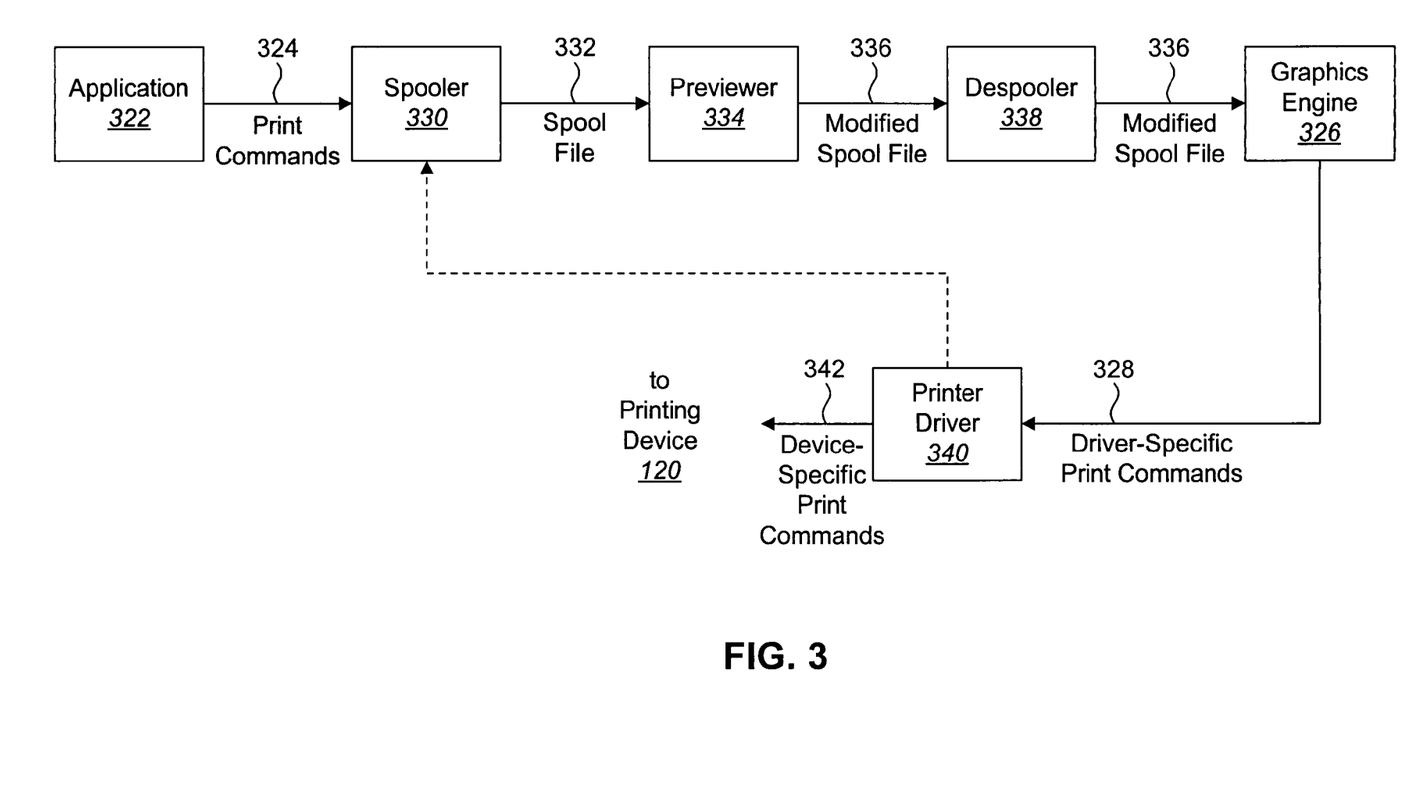
FIG. 3 illustrates software components which may be included in the memory of the computing device in some embodiments.

FIG. 3 illustrates software components which may be included in the memory 108 of the computing device 102 in some embodiments. As shown, an application 322 may be running on the computing device 102. When the application 322 has a print job for printing on the printing device 120, the application 322 sends print commands 324 to a spooler 330. In the Microsoft Windows® family of operating systems, the print commands 324 may be graphics device interface ("GDI") commands.

The spooler 330 generates a spool file 332. The spool file 332 includes the print commands 324. In some embodiments, the print commands 324 may be stored in an intermediate format. For example, in the Microsoft Windows® family of operating systems, the print commands 324 may be stored in the enhanced metafile (EMF) format, which is a direct representation of GDI commands.

The spooler 330 also generates a job setup file (not shown in FIG. 3) to be included in the spool file 332. The job setup file includes default settings for the print job. The spooler 330 may obtain the default settings from the printer driver 340, which stores default settings in a data structure provided by the operating system (for example, a data structure called DEVMODE in the Microsoft Windows® family of operating systems). Exemplary embodiments of the job setup file will be described below.

The spool file 332 is provided to a previewer 334. The previewer 334 displays a preview of the print job. The preview is generated by processing the print commands 324 in the spool file 332 in accordance with the default settings specified in the job setup file. The previewer 334 allows the user to select one or more objects in the print job, and to specify new settings for the selected objects. The job setup file is modified to reflect the new settings for the selected objects. This will be described in greater detail below. The spool file with the modified job setup file will be referred to as a modified spool file 336.

At some point the modified spool file 336 is provided to a despooler 338. The despooler 338 provides the modified spool file 336 to the printer driver 340. When despooling happens, the graphics engine 326 converts the print commands 324 in the modified spool file 336 into driver-specific print commands 328. The driver-specific print commands 328 are in a format that the printer driver 340 for the printing device 120 can understand. For example, in the Microsoft Windows® family of operating systems, the driver-specific print commands 328 may be device driver interface ("DDI") commands.

The printer driver 340 processes the driver-specific print commands 328 in accordance with the job setup file, as modified by the previewer 334, to generate device-specific print commands 342. The device-specific print commands 342 are in a format that the printing device 120 can understand. The printer driver 340 sends the device-specific print commands 342 to the printing device 120.

In some embodiments, the printer driver may be configured to include its own spooler, previewer, and despooler. This spooler in the driver is normally called a journal file writer and reader. This would achieve the same result as the spooler, except that in some cases the operating system provides the spooling mechanism and may be buggy. By doing the work in the driver, it may be easier to fix the bugs.

Figure 4:
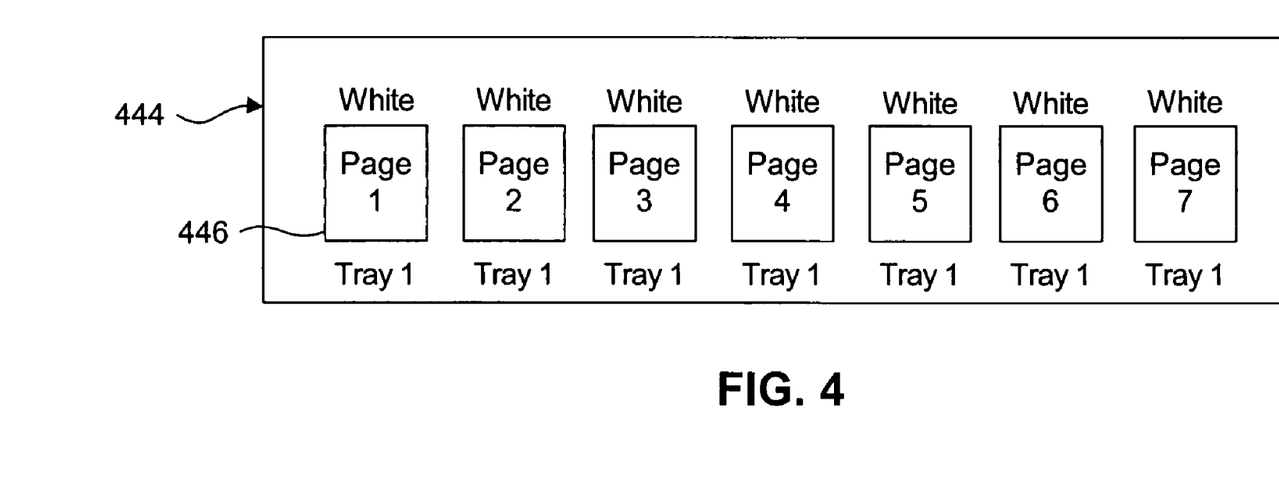
FIG. 4 illustrates an exemplary print job.

FIG. 4 illustrates an exemplary print job 444. The print job 444 includes seven pages 446. In this print job 444, all seven pages 446 are printed on white paper from Tray 1.

Under some circumstances, it may be desirable to select a few pages 446 to have different settings than the rest of the print job 444. Embodiments disclosed herein enable a diverse set of printing options in a much simpler fashion than known methods.

Figure 5:
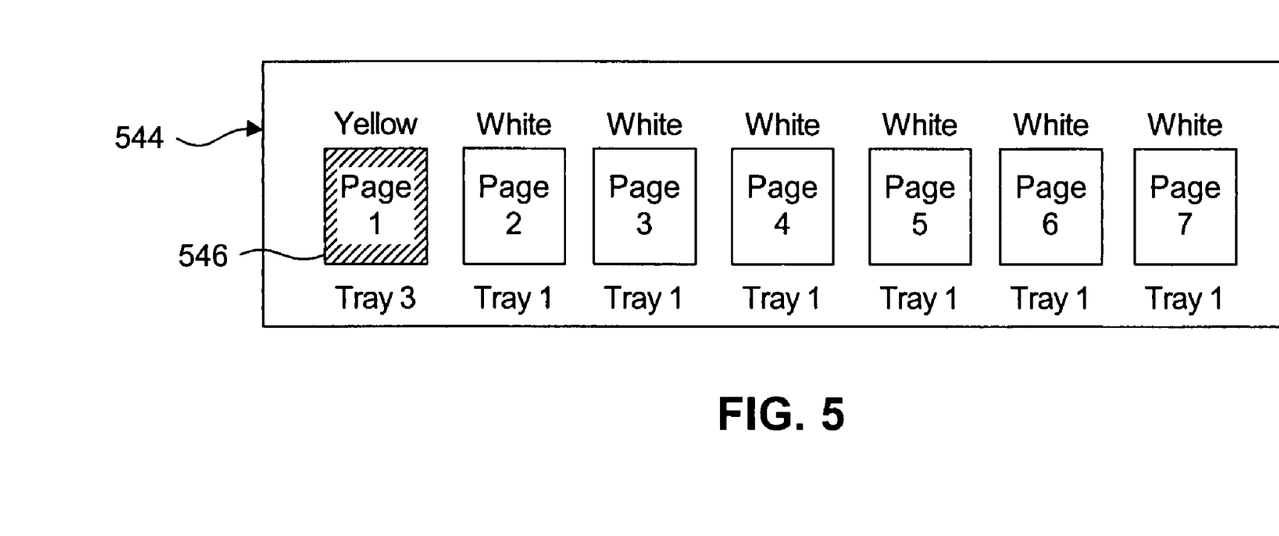
FIG. 5 illustrates the exemplary print job in FIG. 4 with a different tray used for the first page.

FIG. 5 illustrates another exemplary print job 544. As before, the print job 544 includes seven pages 546. The print job 544 shown in FIG. 5 has a different first page on a seven page print job 544. This can be achieved by simply selecting the first physical page and selecting a different tray. In this example, Tray 3 contains yellow paper, and Tray 1 has normal white paper. In the current art, a "Different First Page" checkbox is sometimes included in the dialog box. At times this checkbox can be difficult to find or unintuitive.

Figure 6:
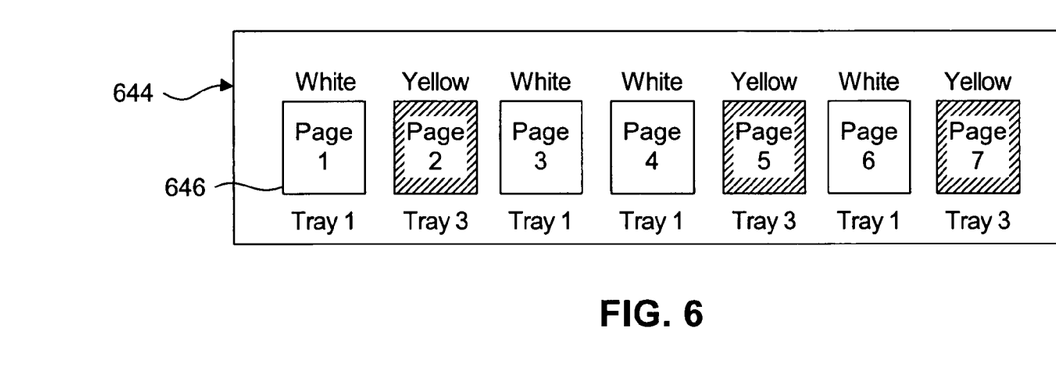
FIG. 6 illustrates the exemplary print job in FIG. 4 with a complex set of different trays used for different pages.

FIG. 6 shows a more complex job setup 644. As before, the print job 644 includes seven pages 646. In this print job 644, pages two, five, and seven are to use a different tray. While a conventional driver could allow the user to type in page numbers, this would force the user to remember which pages to affect. A previewer that allows sub-job settings opens "different tray" to any page so that one may now achieve "different second page" or "different tray for pages 2, 5, and 7" easily and intuitively.

Figure 7:
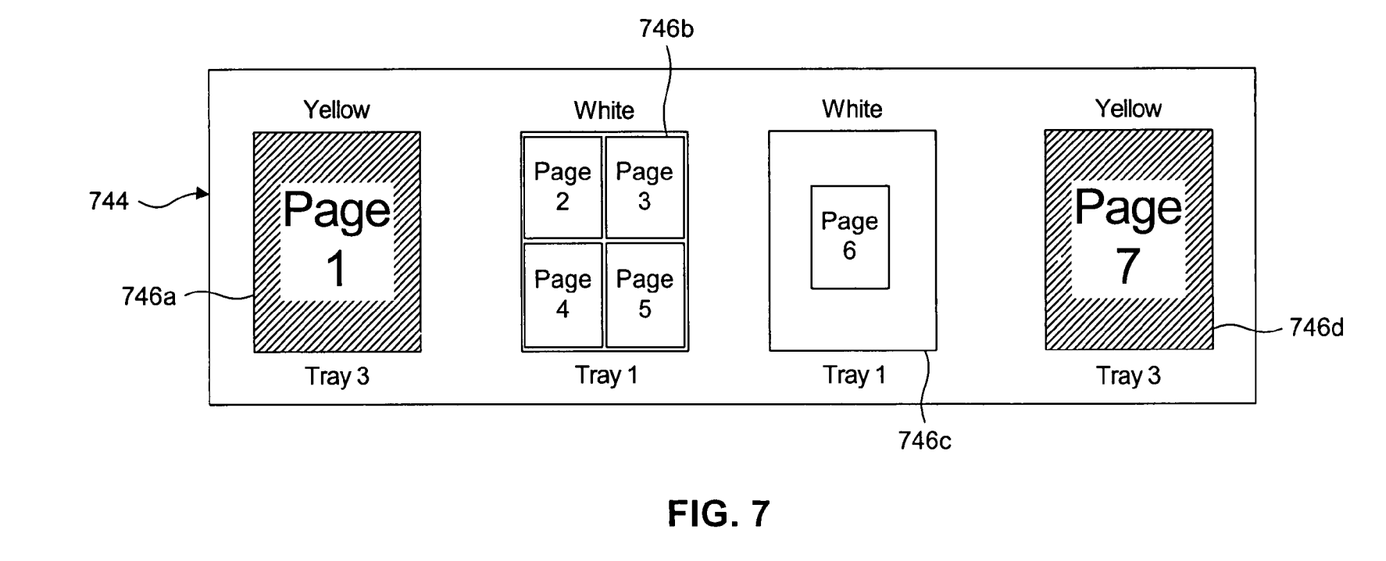
FIG. 7 illustrates the exemplary print job in FIG. 4 with a complex set of trays and size scaling that changes the number of sheets used.

Other page settings can change the actual number of pages in the job. For instance, a user could select four-up printing for the all the pages except for the title and end page. FIG. 7 shows such a complex job 744. As before, the print job 744 includes seven pages 746.

The print job 744 shown in FIG. 7 has several notable characteristics. For example, the print job 744 has different pages for the first and last physical pages. The print job 744 has one-up printing for the first and last pages, and four-up printing for intermediate pages. Because the last physical page is not filled, the image of page six is centered.

Expressing the characteristics of the print job 744 in a conventional way would be extremely difficult and confusing. However, with embodiments disclosed herein, the user could perform the following operations. First, the user could select pages one to six, right click, and then select four-up. At this point the display may change to show four physical pages. The user may then select the first physical page 746a, right click, and select a different tray. The user may then select the last physical page 746d, right click, and select a different tray. The user may then select the third physical page 746c, right click, and select "center". Yet other settings can change the color processing or quality of different parts of the job. This is discussed in greater detail in copending U.S. patent application Ser. No. 10/876,837, entitled "Systems And Methods For Segmenting Pages And Changing Settings For Graphical Elements In Printing," filed Jun. 24, 2004, with inventors Andrew R. Ferlitsch and James E. Owen, which is assigned to the assignee of the present invention, and which is hereby incorporated by reference in its entirety.

There are a variety of ways in which the user may change the settings for selected object(s) within an imaging job. For example, a user may right-click (i.e., press the right button on the mouse and release it) on an object and in response, a menu may be displayed which shows relevant options. This method eliminates cluttering the display with unnecessary options, allows partial view of the selected objects, and simplifies the matching of the object and the setting. In some embodiments, one of the menu items may be "more options . . . " Selecting the "more options . . . " menu item may bring up a full dialog box with the relevant options, which would allow selecting multiple options easily and quickly.

In some embodiments, when the user selects an object within the preview, the appearance of the object may be changed to reflect the fact that the object has been selected. For example, when the user selects a page of a print job, a thicker border may be drawn around the page. Alternatively, the colors of the image of the page may be inverted. When the user selects individual graphic elements on the page, four small rectangles may be shown on the top, bottom, left, and right of the selected graphic element. The previewer 334 may utilize the same style of dialog boxes and tools that the operating system supports.

Figure 8:
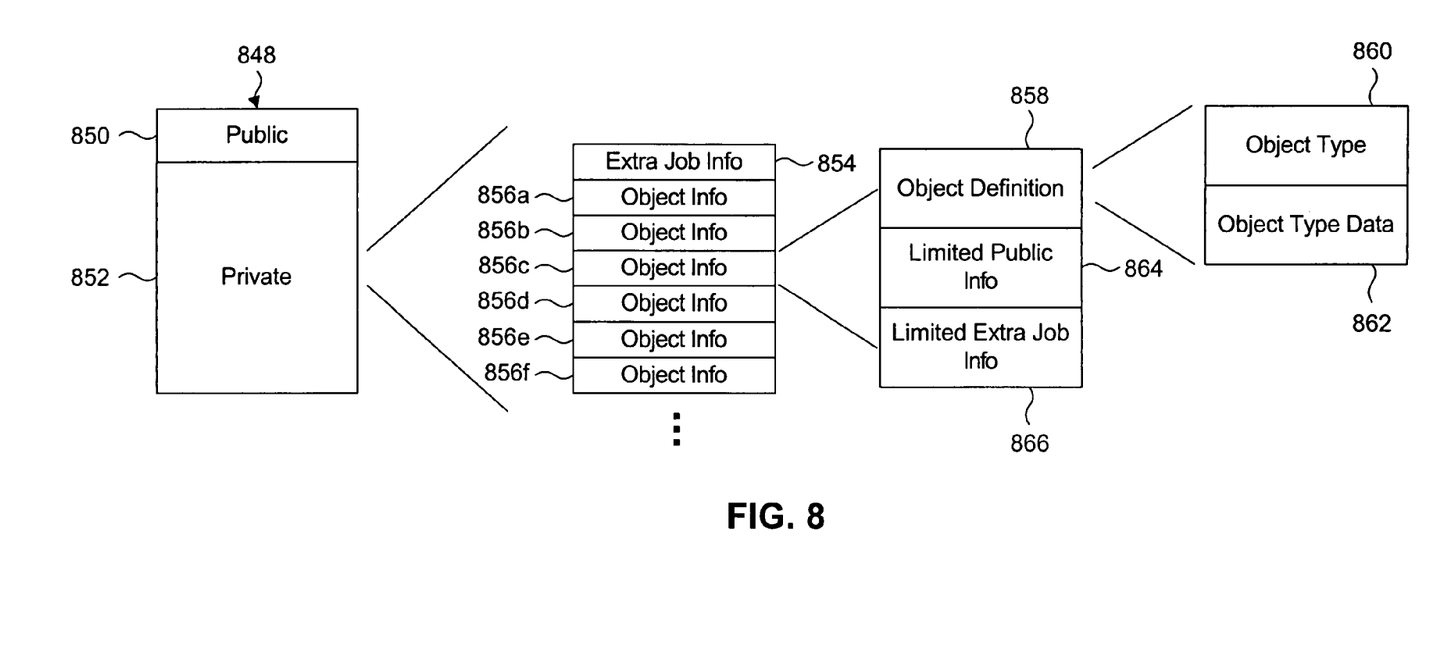
FIG. 8 illustrates an embodiment of a job setup file.

FIG. 8 illustrates an embodiment of the job setup file 848. The job setup file 848 includes a public section 850 and a private section 852. The private section 852 begins with an extra job information section 854. The extra job information section 854 includes one or more settings that apply to the entire print job. The extra job information section 854 is followed by one or more object information sections 856. Each object information section 856 includes one or more settings that apply to a specific object within the print job.

Each object information section 856 includes an object definition 858. The object definition 858 includes an object type section 860 and an object type data section 862. The object type section 860 describes the object that corresponds to the object information section 856. For example, the object type section 860 may indicate that the object information section 856 corresponds to a logical page, a physical page, a region of a physical or logical page, one or more graphic elements, or the like. The object type data section 862 holds data that describes the object. For example, if the object is one or more pages, the object type data section 862 may include integers corresponding to the page numbers. As another example, if the object is a region of a page, the object type data section 862 may include data describing the coordinates of the region.

Each object information section 856 also includes a limited public information section 864 and a limited extra job information section 866. The limited public information section 864 and the limited extra job information section 866 include settings that only apply to the object corresponding to the object information section 856. For instance, in the example discussed above in connection with FIG. 7, the user changed the default paper tray setting for physical pages 1 and 4. Thus, in this example, the job setup file 848 may include an object information section 856 for physical pages 1 and 4. This object information section 856 may include a limited extra job information section 866 with the new paper tray setting.

In the Microsoft Windows® family of operating systems, there is a data structure called DEVMODE which may be used to store settings for a print job. In some embodiments, the DEVMODE data structure may be used to implement the job setup file 848. In current implementations, the DEVMODE data structure has a maximum allowed size of 2 k. In embodiments where the DEVMODE data structure is used to implement the job setup file 848, the size of the job setup file 848 may be the maximum allowed size of the DEVMODE data structure (e.g., 2 k in current implementations).

Where the job setup file 848 has a maximum allowed size, it may be advantageous for the size of the object type data section 862 to be variable, so that the job setup file 848 may include additional object information sections 856. Other schemes may also be used to save space. For example, in some embodiments, data that would otherwise be included in the private section 852 of the job setup file 848 is included in a data file (such as an XML file), and the name of the file is stored in the private section 852 of the job setup file 848. Another scheme might involve using variable size sections that only store the differences from the last section and using pointers to access previous sections. Yet another approach might involve compressing the entire private section 852 using lossless compression. With such an approach, the printer driver 340 would uncompress the private section 852 before interpreting it.

As indicated above, in embodiments disclosed herein a user may select one or more objects in a print job and specify new settings for the selected objects. Under some circumstances, it may be difficult for the printer driver 340 to identify the objects in the print job that the user has selected. For example, suppose that the application 322 issues a print command 324 to draw a circle. This print command 324 may get translated to a driver-specific print command 328 to draw a series of scanlines that look like a circle. If the user selects the circle and changes one or more print settings for that circle, this will be noted in the job setup file 848. However, the driver 340 may have a difficult time identifying the circle.

To address this issue, in some embodiments the previewer 334 may be configured to insert one or more dummy commands into the spool file 332. The dummy commands may be used to identify objects within the spool file 332. The dummy commands can be recognized by having unique and extraordinary characteristics, such as coordinates that are completely off the page. In the job setup file 848, an object that the user has selected may be identified by reference to the dummy commands.

Figure 9A:
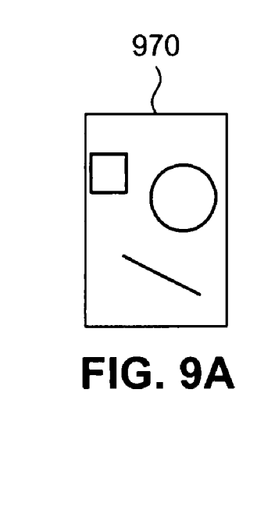
FIGS. 9A through 9D illustrate an example of inserting one or more dummy commands into a spool file.
Figure 9B:
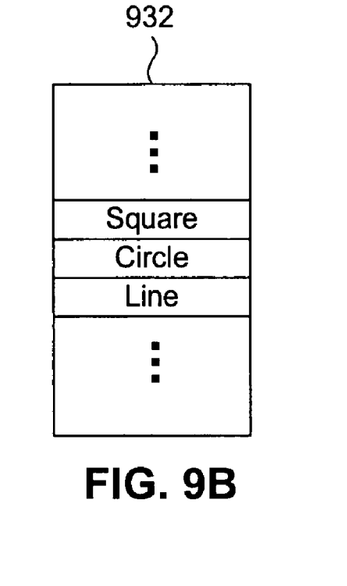

FIGS. 9A through 9D illustrate an example of inserting dummy commands 968 into a spool file 932. FIG. 9A shows a print job consisting of a single page 970. The page 970 includes a square, a circle, and a line. FIG. 9B shows a spool file 932 corresponding to the print job shown in FIG. 9A. The spool file 932 includes one or more commands 972 to draw a square, one or more commands 974 to draw a circle, and one or more commands 976 to draw a line.

Figures 9C, 9D:
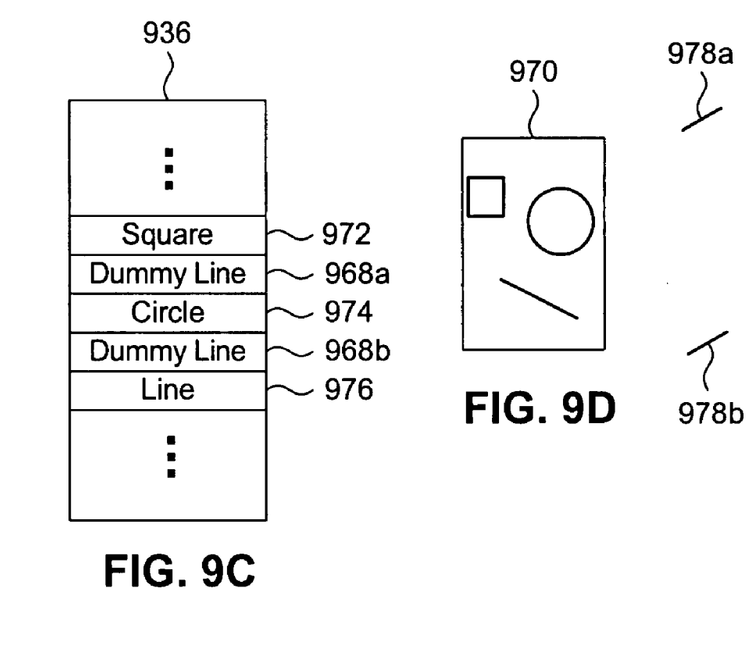

If the user selects the circle and applies a different print setting to the circle, the previewer 334 may insert dummy commands 968 into the spool file 932 before and after the command(s) 974 to draw the circle. FIG. 9C shows the modified spool file 936. A first dummy command 968a is inserted before the command(s) 974 to draw a circle. A second dummy command 968b is inserted after the command(s) 974 to draw a circle. In the job setup file 848, the circle may be identified by referencing the first and second dummy commands 968a, 968b.

The dummy commands 968 may correspond to objects which have unusual characteristics that are easy to recognize. In the example shown in FIGS. 9A-9D, the dummy commands 968a, 968b are commands to draw lines having coordinates that are completely off of the page. This is shown in FIG. 9D. In FIG. 9D, both the first dummy command 968a and the second dummy command 968b correspond to lines 978a, 978b that are drawn off of the page 970.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A computer-readable medium for storing program data, wherein the program data comprises executable instructions for:
   receiving print commands corresponding to a document from an application, wherein the document comprises at least one page;
   obtaining settings for printing the document on a printing device;
   displaying at least one preview image based on the settings, wherein each preview image that is displayed corresponds to a page of the document;
   detecting selection by a user of a region of a page from the at least one preview image;
   receiving from the user at least one new setting for the region of the page selected by the user, wherein the at least one new setting applies to the region of the page but not to the entire page;
   creating a spool file corresponding to the print job;
   creating a job setup file for the spool file, wherein the job setup file comprises a private section and an object information section within the private section, wherein the object information section comprises a setting that applies to a specific object within the print job and that does not apply to the entire print job; and
   inserting dummy commands into the spool file, wherein the dummy commands identify print commands corresponding to the region of the page, and wherein the dummy commands comprise coordinates that are completely off the page.

2. The computer-readable medium of claim 1, further comprising executable instructions for:
   saving the region of the page selected by the user; and
   saving the at least one new setting for the region of the page selected by the user.

3. The computer-readable medium of claim 1, further comprising executable instructions for updating the at least one preview image to reflect the at least one new setting for the region of the page.

4. The computer-readable medium of claim 1, further comprising executable instructions for printing the document or portions of the document according to the at least one new setting for the region of the page.

5. The computer-readable medium of claim 1, wherein the job setup file further comprises:
   a public section; and
   an extra job information section within the private section.

6. The computer-readable medium of claim 5, wherein each object information section comprises an object definition section, a limited public information section, and a limited extra job information section, and wherein the object definition section comprises an object type section and an object type data section.

7. The computer-readable medium of claim 1, wherein the dummy commands are added to the job setup file.

8. A computing device, comprising:
   a processor;
   memory in electronic communication with the processor;
   instructions stored in the memory, the instructions being executable to:
      receive print commands corresponding to a document from an application, wherein the document comprises at least one page;
      obtain settings for printing the document;
      display at least one preview image based on the settings, wherein each preview image that is displayed corresponds to a page of the document;
      detect selection by a user of a region of a page from the at least one preview image;
      receive from the user at least one new setting for the region of the page selected by the user, wherein the at least one new setting applies to the region of the page but not to the entire page;
      create a spool file corresponding to the print job;
      create a job setup file for the spool file, wherein the job setup file comprises a private section and an object information section within the private section, wherein the object information section comprises a setting that applies to a specific object within the print job and that does not apply to the entire print job; and
      insert dummy commands into the spool file, wherein the dummy commands identify print commands corresponding to the region of the page, and wherein the dummy commands comprise coordinates that are completely off the page.

9. The computing device of claim 8, wherein the instructions are also executable to:
   save the region of the page selected by the user; and
   save the at least one new setting for the region of the page selected by the user.

10. The computing device of claim 8, wherein the instructions are also executable to update the at least one preview image to reflect the at least one new setting for the region of the page.

11. The computing device of claim 8, wherein the instructions are also executable to print the document or portions of the document according to the at least one new setting for the region of the page.

12. In a computing device, a method comprising:
   receiving print commands corresponding to a document from an application, wherein the document comprises at least one page;
   obtaining settings for printing the document;
   displaying at least one preview image based on the settings, wherein each preview image that is displayed corresponds to a page of the document;

detecting selection by a user of a region of a page from the at least one preview image;

receiving from the user at least one new setting for the region of the page selected by the user, wherein the at least one new setting applies to the region of the page but not to the entire page;

creating a spool file corresponding to the print job;

creating a job setup file for the spool file, wherein the job setup file comprises a private section and an object information section within the private section, wherein the object information section comprises a setting that applies to a specific object within the print job and that does not apply to the entire print job;

updating the at least one preview image to reflect the at least one new setting for the region of the page; and inserting dummy commands into the spool file, wherein the dummy commands identify print commands corresponding to the region of the page, and wherein the dummy commands comprise coordinates that are completely off the page.

13. The method of claim 12, further comprising:

saving the region of the page selected by the user; and saving the at least one new setting for the region of the page selected by the user.

14. The method of claim 12, further comprising printing the document or portions of the document according to the at least one new setting for the region of the page.

* * * * *